Figure 1:
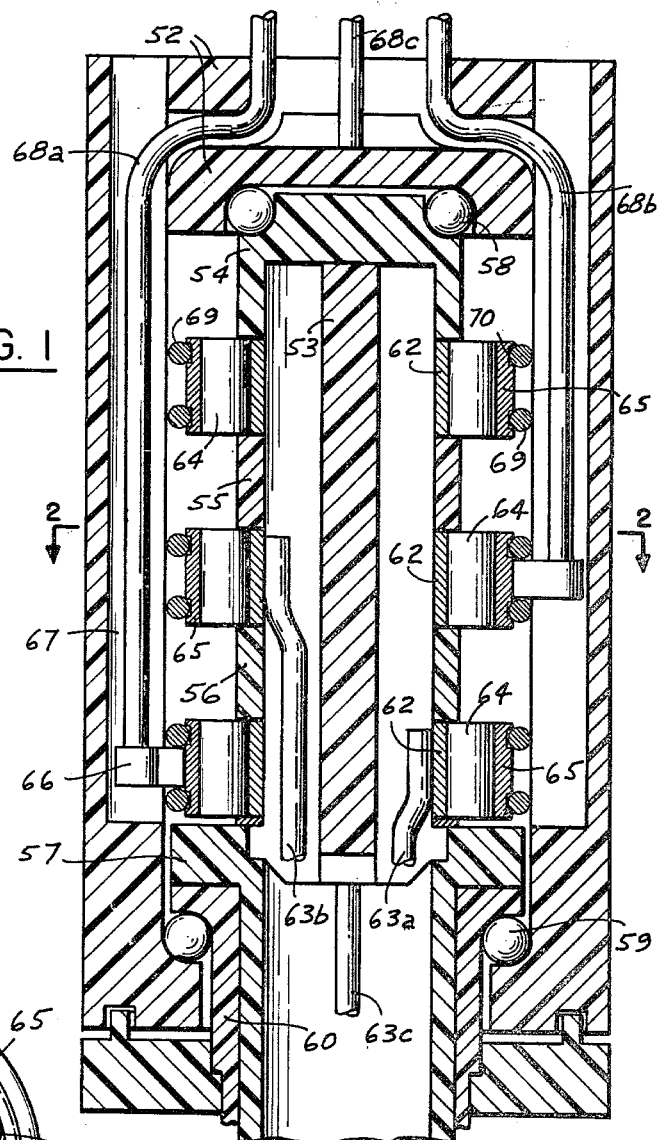

July 13, 1965    K. MOHR    3,195,094
ROTARY ELECTRIC CABLE COUPLING
Original Filed June 6, 1960

INVENTOR.
KARL MOHR
BY Hane and Nydick
ATTORNEYS

United States Patent Office 3,195,094
Patented July 13, 1965

3,195,094
ROTARY ELECTRIC CABLE COUPLING
Karl Mohr, Aschaffenburg (Main), Germany, assignor to Ultra-Prazisionswerk G.m.b.H., Aschaffenburg (Main), Germany, a firm
Original application June 6, 1960, Ser. No. 34,083, now Patent No. 3,089,113, dated May 7, 1963. Divided and this application Feb. 7, 1963, Ser. No. 256,899
3 Claims. (Cl. 339—8)

The present application is a divisional application divided out of co-pending application Serial No. 34,083, filed June 6, 1960 and now matured in Patent 3,089,113, issued May 7, 1963.

This invention relates to an electric cable coupling of the type which consists of mutually concentric and relatively turnable units with current-transmission members provided therein.

Electric cable couplings of said kind are known, but they are possessed of certain disadvantages, and in one of its particular aspects the invention is directed to the avoidance of these disadvantages and to providing a coupling for the connection of electric cables and the like which will permit of any number of turns between the individual units but will nevertheless have a practically unlimited duration of life with hardly any intermediate resistance.

Apart from the avoidance, as aforesaid, of existing disadvantages, another feature of the invention consists in the arrangement within an electric cable coupling of currentless as well as of current-conductive mechanical bearings intermediate the individually turning units, of which the current-conductive bearings may be made resilient in any known or convenient manner, while it is another feature of the invention to provide yieldingly turnable antifriction members to serve as current-transmission parts and to arrange them so as to render them free from the mechanical strains of the turnable bearings.

In accordance with the invention the individually turnable units may be made of insulating material with their internal parts being in the shape of a radially subdivided tube. The parts of the coupling upon which the resiliently arranged contact members are carried may in each case be suited to the respective number of cable strands which are to be connected by the coupling.

In a known coupling of the aforesaid type, antifriction members, such as balls or rollers, are used to maintain the electric contact between the individually turnable units. They are subjected to the influence of a spring which is common to all units and which at the same time carries out the function of a revoluble bearing. Owing to this arrangement, particularly in cases of high speeds or long duration of rotation, the coupling units are subjected to excessive wear, particularly under the influence of mechanical strains, which often give rise to high transition resistance.

This is especially true of cable couplings for the leads of electrical apparatus in which the cable ends are turnable in cable-connecting direction and in which, at the place of current transition between the cable and the coupling, each strand of the cable end is electrically connected with its pertaining contact member over intermediately connected antifriction members and in full contact with the said contact member under the influence of auxiliary forces.

The accompanying drawing illustrates an embodiment of the invention by way of example, it being understood that any alterations or deviations from the arrangements shown may be resorted to in order to suit convenience or requirements.

In the drawing:
FIG. 1 is a vertical section through an electric cable coupling in accordance with the invention, and
FIG. 2 is a section taken on line 2—2 of FIG. 1.

Figure 2:
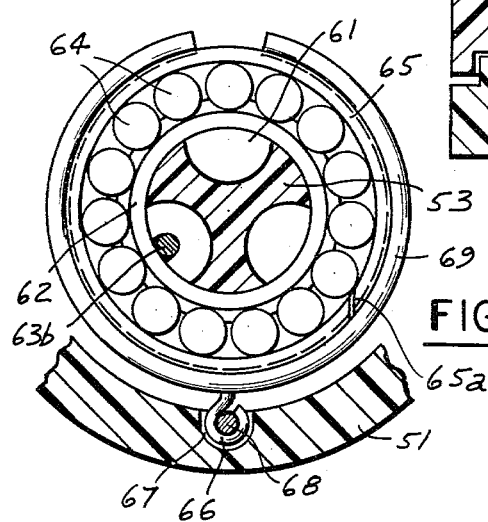

The exemplification of the invention shown in FIGS. 1 and 2 is particularly suitable to provide an electric cable coupling in accordance with the invention. The coupling is constructed with as small an outer diameter as possible, for use in connection with slowly and only intermittently turning coupling units.

The coupling comprises an external cylinder 51 of insulating material and having a closing lid 52, and, also of insulating material, concentrically arranged and coaxially extending internal parts 53, 54, 55, 56 and 57. These parts are assembled so as to form a subassembly and are turnable in relation to the outer cylinder by means of steel balls 58 and 59. A bushing 60 is preferably interposed between the outer cylinder 51 and the internal cylindrical part 57 to serve as a cage for the ball bearings 59.

The insulating member 53 is provided with longitudinal grooves 61 and enclosed by the internal current-conductive sleeves 62, which are electrically connected to the leads 63 within said grooves. Distance pieces 54, 55 and 56 of insulating material are provided between the sleeves 62. Distance pieces 54, 55 and 56 and sleeves 62 are held together by part 57, the bearing formed by balls 58 and lid 52.

Anti-friction contact members 64, preferably in the shape of rollers or needles and made of non-magnetic material, such as bronze, are distributed about the sleeves 62 and are held in place preferably by slotted current-conducting cylinder sections 65. Sections 65 are slotted at 65a, thereby rendering the same springy. These cylinder sections are provided with radially angled-off arms 66 which engage into grooves 67 of the external cylinder 51 and serve as connections for the leads 68 which extend through passages in lid 52 to the outside. In this way a twisting of the sections 65 is prevented.

Split rings or helical springs 69 are positioned around the cylinder sections 65 which serve to insure the contact between the conductive bearing parts 62, 64 and 65. Rings 69 are held in position on cylinder sections or sleeves 65 by engaging peripheral grooves 70. Due to the spring action of rings or springs 69, the slotted cylinder section or sleeve 65 is contracted. Current connections between leads 63a, 63b, 63c and leads 68a, 68b and 68c are effected by the three connector sets each formed by an inner cylinder section or sleeve 62, a roller 64, an outer cylinder section or sleeve 65 and an arm 66, to which arm the respective lead is suitably secured. More specifically, lead 63a is connected to lead 68a through the lowermost connector set; lead 63b to lead 68b through the middle connector set; and lead 63c to lead 68c through the uppermost connector set, the last mentioned set being partly concealed in FIG. 1.

The exemplified cable coupling corresponds in respect to its internal construction and the number of contact members to the number of cable strands used, and the cross-sectional areas are selected in accordance with the current and voltage to be carried.

What is claimed is:
1. An antifriction cable coupling for transmitting current between two relatively revolving multiple-lead members, said coupling comprising an outer and an inner substantially cylindrical insulation member arranged concentrically one within the other radially spaced apart to define an annular chamber therebetween; two antifriction bearings of the deep-groove ball race type adapted to sustain high radially and axially directed loads, said bearings being disposed between said cylindrical members one at each end of said chamber; a plurality of current-transmitting means corresponding in number to the number of cable leads of the members to be connected by said coupling, said current-transmitting means being disposed between said antifriction bearings, each of said current-transmitting means comprising a first and a second sleeve-shaped contact element, the first contact element being mounted on said outer cylindrical member and having a greater inside diameter than the outside diameter of the second contact element, said second contact element being mounted on said inner cylindrical member and arranged concentrically within said first contact element; a plurality of metal rollers for transmitting current disposed between said contact elements, said first contact element being made of resilient material and having a slot extending through its wall, the inside diameter of said first contact element being less than the sum of the outside diameter of said second contact element plus twice the diameter of said rollers, thereby resiliently urging said rollers into rolling contact engagement with said contact elements.

2. An antifriction cable coupling according to claim 1, in which said inner member comprises a central supporting member carrying said second contact elements axially spaced therefrom by insulation spacers, the outside diameter of said spacers being greater than the outside diameter of said second contact element, thereby forming retaining shoulders for said rollers, the end spacers having ball races for said antifriction bearings formed thereon.

3. An antifriction cable coupling according to claim 1, in which spring rings encompass said first slotted contact elements, thereby assisting the resiliency of said first contact elements.

References Cited by the Examiner
UNITED STATES PATENTS

| | | | |
|---|---|---|---|
| 2,726,371 | 12/55 | Seeloff | 339—5 |
| 3,021,497 | 2/62 | Riley | 339—5 |

DONLEY J. STOCKING, *Primary Examiner.*

JOSEPH D. SEERS, ALFRED S. TRASK, *Examiners.*